(12) United States Patent
Shin

(10) Patent No.: US 11,528,471 B2
(45) Date of Patent: Dec. 13, 2022

(54) IMAGE SIGNAL PROCESSOR AND IMAGE SENSOR INCLUDING THE IMAGE SIGNAL PROCESSOR

(71) Applicant: SAMSUNG ELECTRONICS CO., LTD., Suwon-si (KR)

(72) Inventor: Deokha Shin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/817,802

(22) Filed: Mar. 13, 2020

(65) Prior Publication Data
US 2020/0396442 A1 Dec. 17, 2020

(30) Foreign Application Priority Data
Jun. 11, 2019 (KR) .................. 10-2019-0068811

(51) Int. Cl.
| | |
|---|---|
| H04N 17/02 | (2006.01) |
| H04N 17/00 | (2006.01) |
| H04N 5/378 | (2011.01) |
| G06N 3/08 | (2006.01) |
| G06N 3/04 | (2006.01) |
| H04N 5/357 | (2011.01) |

(52) U.S. Cl.
CPC .......... *H04N 17/002* (2013.01); *G06N 3/04* (2013.01); *G06N 3/08* (2013.01); *H04N 5/357* (2013.01); *H04N 5/378* (2013.01)

(58) Field of Classification Search
CPC ...... H04N 17/002; H04N 5/357; H04N 5/378; G06N 3/04; G06N 3/08
USPC ........................................................ 348/187
See application file for complete search history.

(56) References Cited

U.S. PATENT DOCUMENTS

| | | | |
|---|---|---|---|
| 5,636,290 | A | 6/1997 | Kita et al. |
| 9,344,690 | B2* | 5/2016 | Nowozin ............ H04N 9/04515 |
| 9,807,382 | B2 | 10/2017 | Duparre et al. |
| 9,996,903 | B2 | 6/2018 | Ovsiannikov et al. |
| 10,140,573 | B2 | 11/2018 | Julian et al. |
| 10,657,425 | B2* | 5/2020 | Martinello ............ G06K 9/6271 |
| 10,949,951 | B2* | 3/2021 | Tang ......................... G06T 3/40 |
| 2009/0027504 | A1* | 1/2009 | Lim ..................... H04N 17/002 348/187 |
| 2010/0103292 | A1 | 4/2010 | Xiong et al. |
| 2012/0294515 | A1 | 11/2012 | Chida |
| 2014/0270570 | A1 | 9/2014 | Litvinov |
| 2016/0328642 | A1 | 11/2016 | Himebaugh |
| 2018/0024248 | A1 | 1/2018 | Orejas et al. |

(Continued)

FOREIGN PATENT DOCUMENTS

JP 3488729 10/2003

*Primary Examiner* — Trang U Tran
(74) *Attorney, Agent, or Firm* — F. Chau & Associates, LLC

(57) ABSTRACT

An image signal processor and an image sensor including the same are disclosed. An image sensor includes a pixel array configured to convert received optical signals into electrical signals, a readout circuit configured to convert the electrical signals into image data and output the image data, and an image signal processor configured to perform deep learning-based image processing on the image data based on training data selected from among first training data and second training data based on a noise level of the image data.

13 Claims, 17 Drawing Sheets

(56) References Cited

U.S. PATENT DOCUMENTS

2018/0367752 A1 12/2018 Donsbach et al.
2019/0035047 A1 1/2019 Lim et al.

* cited by examiner (MD1)

(MD2)

IMAGE SIGNAL PROCESSOR AND IMAGE SENSOR INCLUDING THE IMAGE SIGNAL PROCESSOR

CROSS-REFERENCE TO RELATED APPLICATION

This application claims the benefit of Korean Patent Application No. 10-2019-0068811, filed on Jun. 11, 2019, in the Korean Intellectual Property Office, the disclosure of which is incorporated herein in its entirety by reference.

BACKGROUND

The present disclosure relates to image signal processing, and more particularly, to an image signal processor that utilizes deep learning technology and an image sensor including the image signal processor.

Deep learning is a discipline of artificial intelligence where algorithms and statistical models are used in computer systems to train neural networks to perform tasks without the use of human instruction. Trained neural networks make computed decisions based on information from input data. Deep learning systems can be used in speech recognition, financial systems, and image processing.

Digital cameras use image sensors to capture images, and image signal processors to process the captured images. The image signal processor performs tasks on image output features such as image sharpening, noise reduction, and color control. As pixel quantities of image sensors increase, image processing speed and accuracy becomes more important.

In many cases, output features of an image sensor are not considered when using deep learning in image processing. Therefore, there is a need in the art for a deep learning system that considers an output of an image sensor for efficient image processing.

SUMMARY

The present disclosure relates to an image signal processor that uses deep learning technology reflecting the output feature of an image sensor, and an image sensor including the same.

According to an aspect of the inventive concept, there is provided an image sensor including: a pixel array configured to convert received optical signals into electrical signals; a readout circuit configured to convert the electrical signals into image data and output the image data; and an image signal processor configured to perform deep learning-based image processing on the image data based on training data selected from among first training data and second training data based on a noise level of the image data.

According to another aspect of the inventive concept, there is provided an image sensor including: a sensing core configured to generate image data of a first pattern or image data of a second pattern based on received optical signals; a memory storing first training data corresponding to the first pattern and second training data corresponding to the second pattern; and an image signal processor configured to perform deep learning-based image processing on the image data based on training data selected from among the first training data and the second training data based on a pattern of the image data provided from the sensing core.

According to another aspect of the inventive concept, there is provided an image signal processor including: a processing logic configured to perform deep learning-based image processing on image data output from an image sensor; and a mode determiner configured to provide, to the processing logic, training data selected from among first training data and second training data based on a noise level of the image data determined through training based on a first pattern and a second pattern of the image data.

According to another aspect of the inventive concept, a method of image processing is described. The method may include receiving light at an image sensor based on setting information; generating an image output based on the received light; estimating a noise level based on the setting information; selecting training data from among a plurality of training data sets based on the estimated noise level; and performing a deep learning process on the image output based on the selected training data to produce a modified image output.

In some embodiments, the method further comprises identifying one or more bad pixels of the image sensor; and adjusting the selected training data based on identifying the one or more bad pixels. In some embodiments, each of the plurality of training data sets is stored in a separate memory component. In some embodiments, the deep learning process comprises at least one of a color coordinate change, a brightness adjustment, a sharpness adjustment, and a contrast adjustment of image output.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The present disclosure provides for a deep learning system where a plurality of weight sets reflecting the characteristics of each of a plurality of sensor output modes are stored in a memory, and processing logic selectively reads a weight set according to an output mode and performs deep learning-based image processing.

Additionally, a noise level estimator estimates a noise level of image data based on sensing setting information such as an analog gain, an exposure time, etc. and selects a mode (output mode) based on the noise level. A logic circuit performing the deep learning-based image processing may be implemented in hardware.

A pixel array may be implemented in a pattern and may output different types of image data according to a plurality of output modes. The weight sets may be determined through training based on the output modes. Bad pixel information may be stored to prevent bad pixels from affecting the image processing, and the weights corresponding to bad pixels are set to a zero value.

Hereinafter, embodiments of the inventive concept are described in detail with reference to the accompanying drawings.

Figure 1:
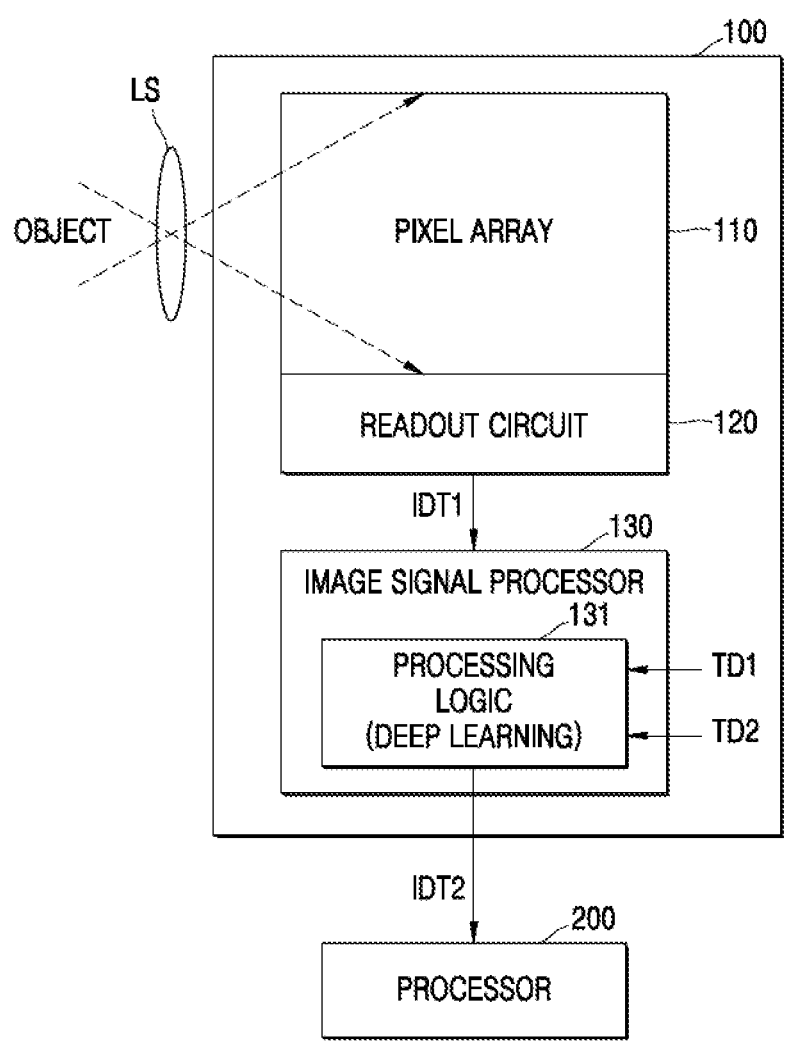
FIG. 1 is a block diagram of an image sensor according to an embodiment of the inventive concept.

FIG. 1 is a block diagram of an image sensor 100 according to an embodiment of the inventive concept.

The image sensor 100 may convert an optical signal of an object input through an optical lens LS into image data. The image sensor 100 may be mounted in an electronic apparatus with an image or optical sensing function. For example, the image sensor 100 may be mounted in an electronic apparatus such as digital still cameras, digital video cameras, smartphones, wearable devices, Internet of Things (IoT) devices, tablet personal computers (PCs), personal digital assistants (PDAs), portable multimedia players (PMPs), navigation devices, etc. Furthermore, the image sensor 100 may be mounted in an electronic apparatus that may be provided as a part of vehicles, furniture, manufacturing facilities, doors, or various measuring instruments.

Referring to FIG. 1, the image sensor 100 may include a pixel array 110, a readout circuit 120, and an image signal processor 130. The image signal processor 130 may include a processing logic 131 based on deep learning. In an embodiment, the pixel array 110, the readout circuit 120, and the image signal processor 130 may be implemented by a single semiconductor chip or semiconductor module. In an embodiment, the pixel array 110 and the readout circuit 120 may be implemented by a single semiconductor chip. The image signal processor 130 may be implemented by another single semiconductor chip.

The pixel array 110 may be implemented by a photoelectric conversion element. Charge-coupled devices (CCDs) or complementary metal-oxide semiconductors (CMOSs) are examples of photoelectric conversion elements, but are not limited thereto. The pixel array 110 may include a plurality of pixels for converting a received optical signal (light) into an electrical signal, and the pixels may be arranged in a matrix. Each of the pixels may include a light-sensing device. For example, the light-sensing device may include photodiodes, phototransistors, photogates, or pinned photodiodes.

The readout circuit 120 may convert electrical signals received from the pixel array 110 into image data. The readout circuit 120 may amplify electrical signals and perform an analog-digital conversion on the amplified electrical signals. The image data generated by the readout circuit 120 may include pixel data corresponding to each of the pixels of the pixel array 110. The readout circuit 120 may constitute a sensing core with the pixel array 110.

The image signal processor 130 may perform deep learning-based image processing on the image data output from the readout circuit 120. For example, the image signal processor 130 may perform image processing, such as bad pixel correction or noise removal, on the image data.

The image signal processor 130 may output image-processed image data. The image-processed image data may be provided to an external processor 200 such as a main processor or a graphics processor of an electronic apparatus in which the image sensor 100 is mounted. Image data generated and output by the readout circuit 120 may be referred to as first image data IDT1. Image data output from the image signal processor 130 may be referred to as second image data IDT2.

The image signal processor 130 may include the processing logic 131 based on deep learning. In an embodiment, the processing logic 131 may be implemented in hardware. However, the present disclosure is not limited thereto, and the processing logic 131 may be implemented by software or a combination of hardware and software. The processing logic 131 may perform deep learning-based image processing on the first image data IDT1 based on training data selected from among first training data TD1 and second training data TD2 according to an operation mode of the image sensor 100 or a noise level of the first image data IDT1.

In an embodiment, the readout circuit 120 may change a data pattern of the first image data IDT1 according to the operation mode of the image sensor 100. For example, when the image sensor 100 operates in a first mode, the readout circuit 120 may generate the first image data IDT1 of a first pattern. When the image sensor 100 operates in a second mode, the readout circuit 120 may generate the first image data IDT1 of a second pattern. The first training data TD1 may be collected through training based on the first image data IDT1 of the first pattern. The second training data TD2 may be collected through training based on the first image data IDT1 of the second pattern.

Accordingly, when the image sensor 100 operates in the first mode, the readout circuit 120 may output the first image data IDT1 of the first pattern. Additionally, the processing logic 131 may perform deep learning-based image processing on the first image data IDT1 of the first pattern based on the first training data TD1. Furthermore, when the image sensor 100 operates in the second mode, the readout circuit 120 may output the first image data IDT1 of the second pattern. Additionally, the processing logic 131 may perform deep learning-based image processing on the first image data IDT1 of the second pattern based on the second training data TD2.

The operation mode of the image sensor 100 may be determined according to a user's setting. For example, a user may determine a setting using an electronic apparatus in which the image sensor 100 is mounted, or a sensing setting when the image sensor 100 senses an optical signal of an object. Image sensor 100 may be mounted based on a sensing environment. In an embodiment, the image signal processor 130 may include information about bad pixels of the pixel array 110. During image processing, training data used by the processing logic 131 may be adjusted based on bad pixel information. The first training data TD1 or the second training data TD2 may be an example of training data. The processing logic 131 may perform deep learning-based image processing based on adjusted training data. In an embodiment, the image signal processor 130 may update training data based on the adjusted training data. For example, when the first training data TD1 is used, the image signal processor 130 may adjust the first training data TD1 based on the bad pixel information. Additionally, the processing logic 131 may perform image processing based on the adjusted first training data. The first training data TD1 may be updated to the adjusted data.

Figure 2:
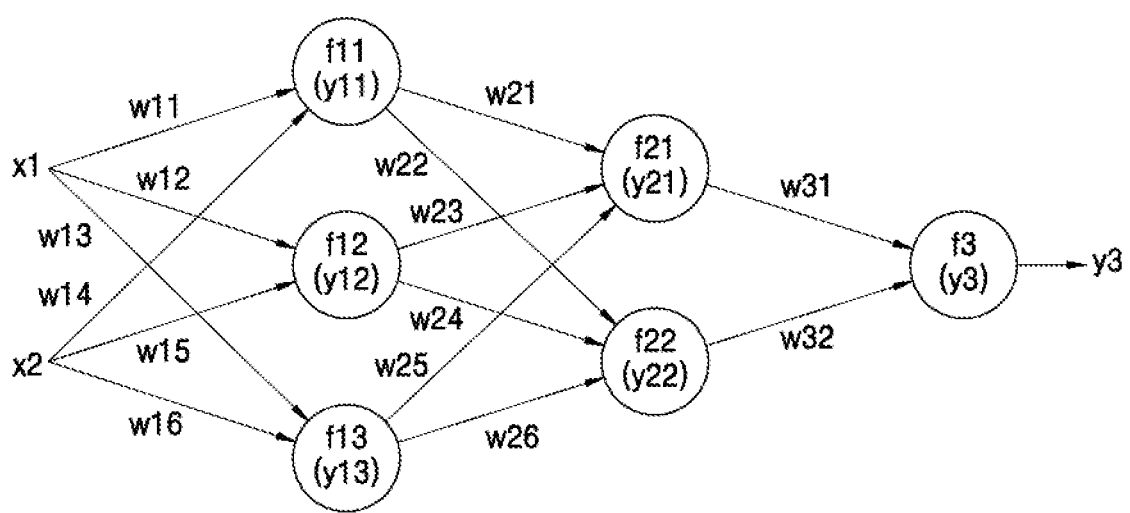
FIG. 2 illustrates an example of a structure of a deep neural network applied to an image signal processor according to an embodiment of the inventive concept.

FIG. 2 illustrates an example of a structure of a deep neural network DNN applied to an image signal processor according to an embodiment of the inventive concept.

Referring to FIG. 2, the deep neural network DNN may include a plurality of layers L1 to L4 that are sequentially processed. Although FIG. 2 illustrates that the deep neural network DNN includes four layers, the present disclosure is not limited thereto, and the number of layers may vary.

The deep neural network DNN may include an input layer, an output layer, and at least one hidden layer. In FIG. 2, a first layer L1 may include an input layer, a fourth layer L4 may include an output layer, and a second layer L2 and a third layer L3 may include hidden layers. In the first layer L1, second layer L2, third layer L3, and fourth layer L4 may include a convolution layer, a pooling layer, or a zero-padding layer.

The deep neural network DNN may perform an operation through the first layer L1, second layer L2, third layer L3, and fourth layer L4 based on input data, such as x1 and x2, and generate output data, such as y3, according to a result of the operation.

The first layer L1, second layer L2, third layer L3, and fourth layer L4 may include at least one processing node ND (or referred to as a neuron). The input and output of each of the processing nodes NDs may be respectively referred to as input activation and output activation. The activations such as x1, x2, y11, y12, y13, y21, y22, and y3, may be determined by respective weights, such as w11 to w32, and activation functions, such as f11 to f3. The processing nodes NDs of neighboring layers may be fully connected to each other or may share the weights.

In the first layer L1, second layer L2, third layer L3, and fourth layer L4, the processing nodes NDs may be implemented by the processing logic 131 of FIG. 1, and weights. Weights such as W11 to w32, which represent a network between layers, may be implemented as training data, such as the first training data TD1 and the second training data TD2.

As described above, the image signal processor 130, according to an embodiment of the inventive concept, may selectively provide the processing logic 131 with training data for example, based on the pattern of the first image data IDT1. For example, the image signal processor 130 may selectively provide the processing logic 131 with the first training data TD1 and the second training data TD2, according to the first and second patterns of the first image data IDT1. Accordingly, deep neural networks DNNs with various structures may be implemented. Deep neural networks DNNs with various structures may be adaptively employed according to the patterns of the first image data IDT1 without redesigning the processing logic 131. Furthermore, there may be no need to implement at least two logics reflecting the first training data TD1, and the second training data TD2, and an area on a layout of the processing logic 131 may be reduced.

Figure 3:
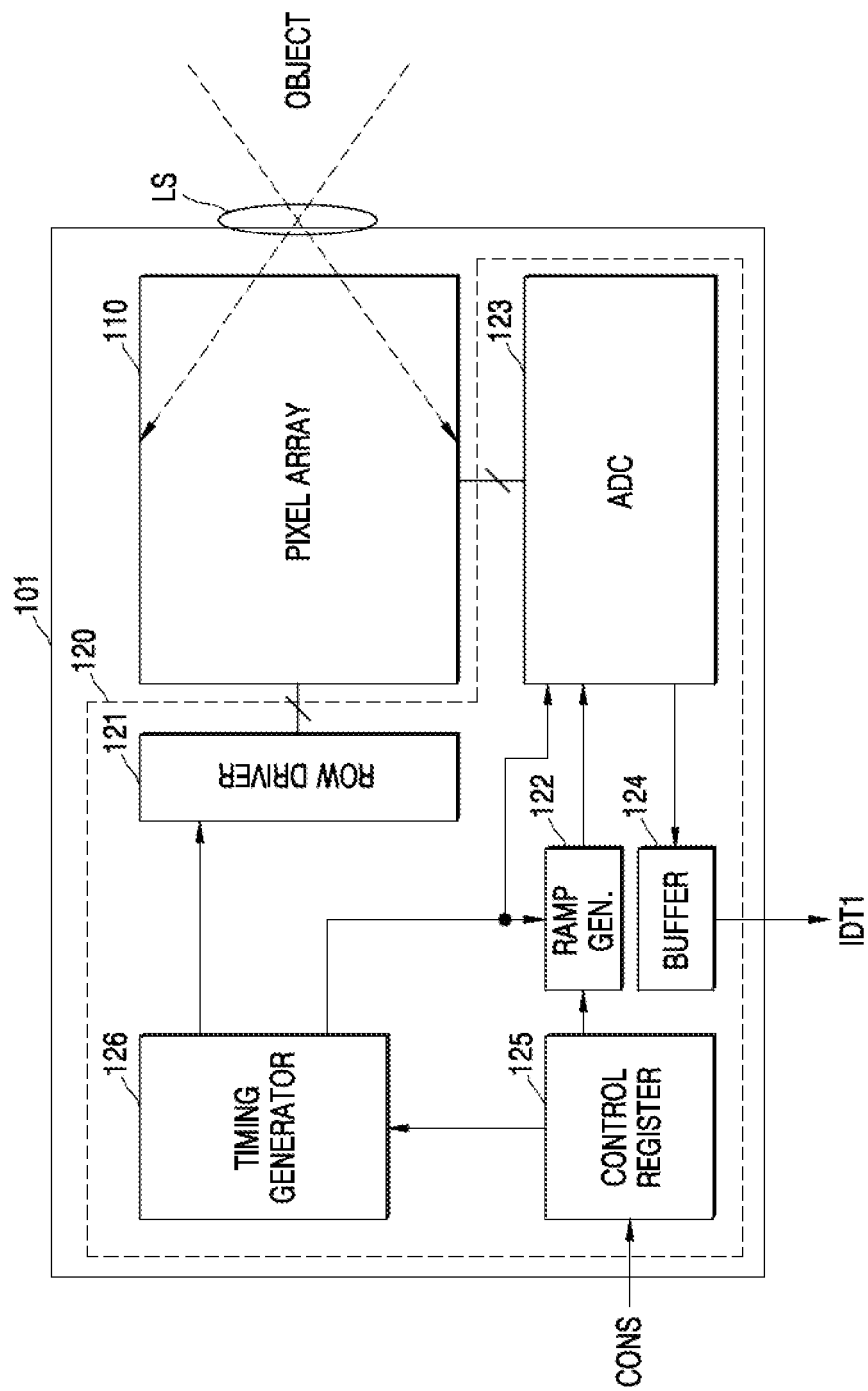
FIG. 3 is a block diagram of a sensing core of the image sensor of FIG. 1.

FIG. 3 is a block diagram of a sensing core 101 of the image sensor 100 of FIG. 1.

Referring to FIG. 3, the sensing core 101 may include the pixel array 110 and the readout circuit 120. The readout circuit 120 may include a row driver 121, a ramp signal generator 122, an analog-digital converter (ADC) 123, a buffer 124, a control register 125, and a timing generator 126.

The pixel array 110 may be electrically connected to the row driver 121 and the ADC 123 through signal lines.

The row driver 121 may operate the pixel array 110 in units of rows under the control of the timing generator 126. The row driver 121 may decode a row control signal such as an address signal, and select at least one row line from among a plurality of row lines forming the pixel array 110, in response to the decoded row control signal. An address signal may be generated by the timing generator 126. The pixel array 110 may output a pixel signal from the row selected to the ADC 123, according to a row select signal provided by the row driver 121.

The ADC 123 may compare the pixel signal with a ramp signal provided by the ramp signal generator 122 to generate a result signal and convert the result signal into a digital signal. The result signal is converted to a digital signal by counting the number of result signals. The ADC 123 may output the converted digital signal as original image data to the buffer 124. The ADC 123 may include an amplifier for amplifying a pixel signal, a comparator, and a counter.

The control register 125 may store various setting values (register values) for the elements of the readout circuit 120, such as the row driver 121, the ramp signal generator 122, the ADC 123, the buffer 124, and the timing generator 126. Additionally, the control register 125 may control operations of the elements based on the setting values. The setting values may be received via a control signal CONS, including the setting values from, such as the external processor 200 of FIG. 1.

The timing generator 126 may control the operation timing of the row driver 121, the ADC 123, and the ramp signal generator 122 under the control of the control register 125.

The buffer 124 may temporarily store the original image data output from the ADC 123 and then output the original image data as the first image data IDT1 to the image signal processor 130 of FIG. 1.

Figure 4A:
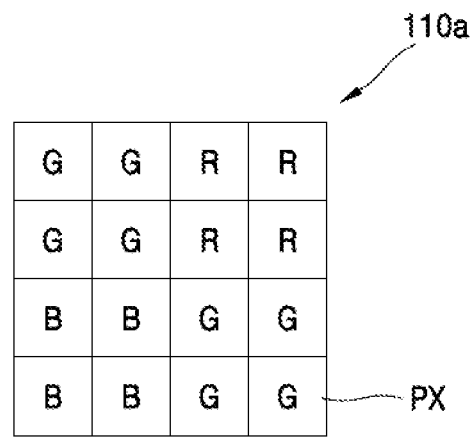
FIG. 4A illustrates an example of a pixel array provided in an image sensor according to an embodiment of the inventive concept.
Figure 4B:
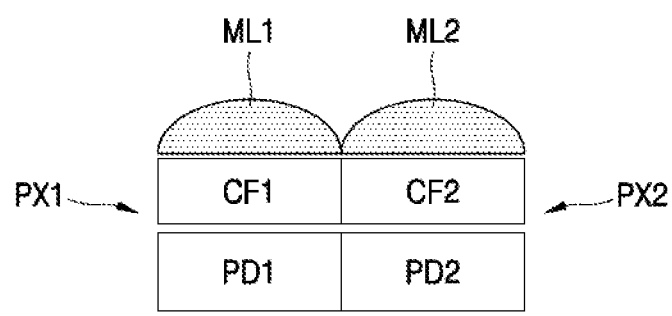
FIGS. 4B and 4C are structural diagrams of two pixels arranged close to each other in the pixel array of FIG. 4A.
Figure 4C:
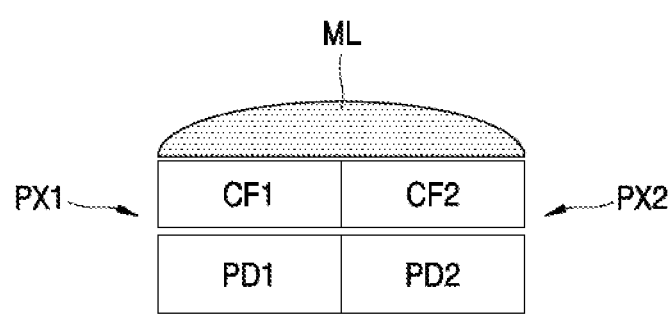

FIG. 4A illustrates an example of a pixel array 110*a* provided in an image sensor according to an embodiment of the inventive concept and FIGS. 4B and 4C are structural diagrams of two pixels arranged close to each other in the pixel array 110*a* of FIG. 4A.

Referring to FIG. 4A, the pixel array 110*a* may have a structure of a Quad-Bayer pattern. Four pixels PX arranged 2×2 (2 rows and 2 columns) may include a color filter of the same color. Accordingly, the pixel array 110*a* may include 4×4 pixels of 2×2 green pixels G, 2×2 red pixels R, 2×2 blue pixels B, and 2×2 green pixels G.

Referring to FIG. 4B, a first pixel PX1 and a second pixel PX2 may be arranged close to each other. The first pixel PX1 may include a first microlens ML1, a first color filter CF1, and a first light-receiving element PD1 such as a photodiode. The second pixel PX2 may include a second microlens ML2, a second color filter CF2, and a second light-receiving element PD2. The first color filter CF1 and the second color filter CF2 may be for the same color.

In an embodiment, as illustrated in FIG. 4C, the first pixel PX1 and the second pixel PX2 may share a microlens ML.

Figure 5:
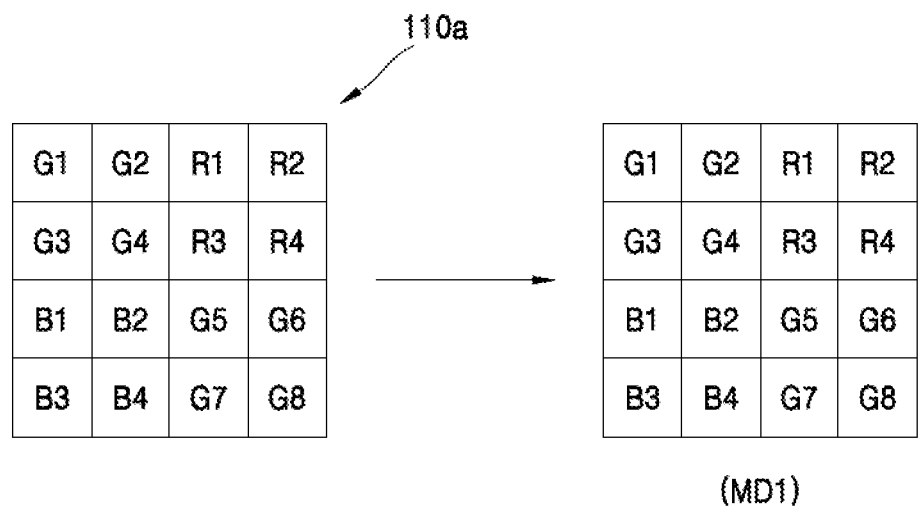
FIG. 5 illustrates a data pattern of image data according to an operation mode of an image sensor according to an embodiment of the inventive concept.
Figure 5:
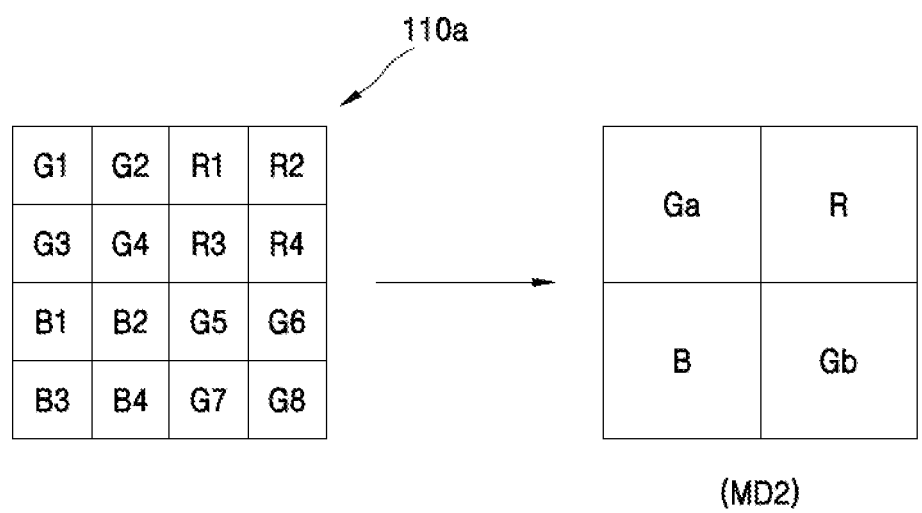

FIG. 5 illustrates a data pattern of image data according to an operation mode of the image sensor 100 according to an embodiment of the inventive concept.

Referring to FIG. 5, 4×4 pixels in the pixel array 110a may include first to fourth green pixels G1 to G4, first to fourth red pixels R1 to R4, first to fourth blue pixels B1 to B4, and fifth to eighth green pixels G5 to G8.

In a first operation mode MD1, the first image data IDT1 may include pixel data corresponding to each of the first to fourth green pixels G1 to G4, the first to fourth red pixels R1 to R4, the first to fourth blue pixels B1 to B4, and the fifth to eighth green pixels G5 to G8. The readout circuit 120 of FIG. 1 may output the first image data IDT1 of a Quad-Bayer pattern.

In a second operation mode MD2, the first image data IDT1 may include pixel data corresponding to a first green pixel Ga, a red pixel R, a blue pixel B, and a second green pixel Gb. The pixel data corresponding to the first green pixel Ga may represent a sum value of sensing signals of the first to fourth green pixels G1 to G4 of the pixel array 110a, the pixel data corresponding to the red pixel R may represent a sum value of sensing signals of the first to fourth red pixels R1 to R4, the pixel data corresponding to the blue pixel B may represent a sum value of sensing signals of the first to fourth blue pixels B1 to B4, and the pixel data corresponding to the second green pixel Gb may represent a sum value of sensing signals of the fifth to eighth green pixels G5 to G8.

In other words, in the second operation mode MD2, a sum value of sensing signals of neighboring pixels, including the same color filter, may be output as pixel data. A big pixel effect may be obtained, and the signal-to-noise ratio (SNR) and brightness of the first image data IDT1 may be increased. As such, in the second operation mode MD2, the readout circuit 120 of FIG. 1 may output the first image data IDT1 of a Bayer pattern.

When an optical signal of an object is sensed in a low illumination environment, the quality of a captured image may deteriorate. As described above, when the image sensor 100 operates in the second operation mode MD2, the brightness of the first image data IDT1 may be increased and noise may be reduced due to the big pixel effect, and the quality of a captured image may increase.

In an embodiment, the first operation mode MD1 may include a capture mode, and the second operation mode MD2 may include a preview or video mode. In the capture mode, as the readout circuit 120 outputs the first image data IDT1 of a Quad-Bayer pattern, the high resolution of the first image data IDT1 may be maintained. In the preview or video mode, as the readout circuit 120 generates the first image data IDT1 of a Bayer pattern by summing the sensing signals, a high SNR and a high frame rate may be secured.

Figure 6:
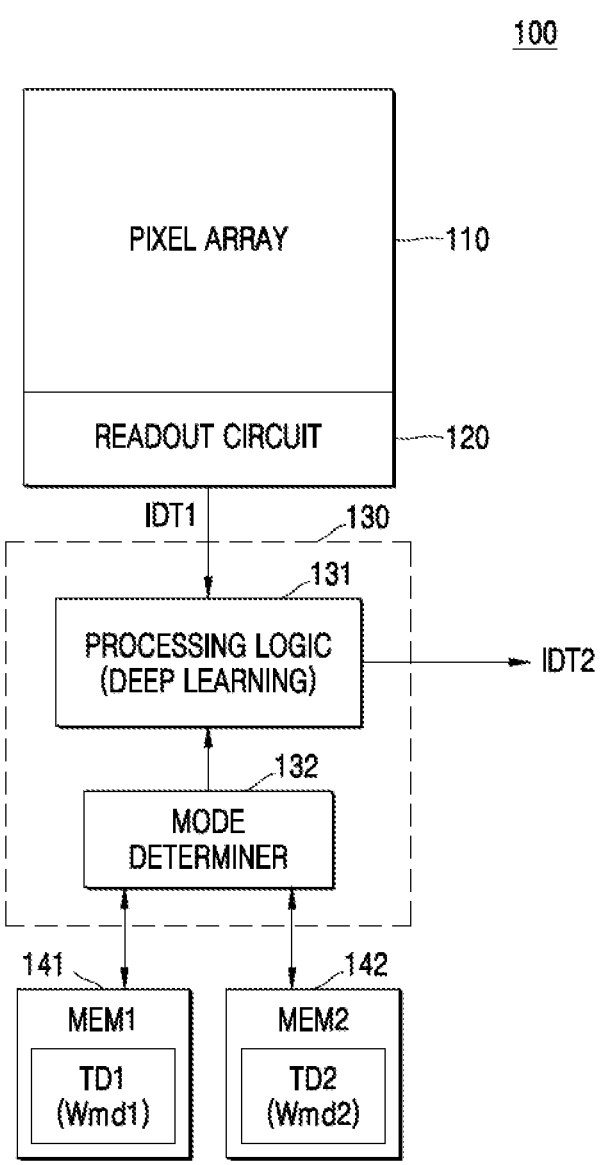
FIG. 6 is a block diagram of an image signal processor according to an embodiment of the inventive concept.

FIG. 6 is a block diagram of the image signal processor 130 according to an embodiment of the inventive concept.

Referring to FIG. 6, the image signal processor 130 may include the processing logic 131 and a mode determiner 132.

The processing logic 131 may include nodes included in a plurality of layers of a deep neural network (the deep neural network DNN of FIG. 2). The processing logic 131 may perform deep learning-based image processing on the first image data IDT1 based on training data.

The mode determiner 132 may determine the operation mode of the image sensor 100 and provide the processing logic 131 with the training data corresponding to the determined operation mode among the first training data TD1 and the second training data TD2.

In an embodiment, the mode determiner 132 may be implemented in hardware. However, the present disclosure is not limited thereto, and the mode determiner 132 may be implemented in firmware or software including a mode determination algorithm, and as a processor, such as a microprocessor or CPU, included in an image signal processor 130 performs the mode determination algorithm, the function of the mode determiner 132 may be performed.

Each of the first training data TD1 and the second training data TD2 may include weights Wmd1 of the first mode and weights Wmd2 of the second mode. As described above, the weights Wmd1 of the first mode may include weights of a deep neural network collected through training based on the first pattern of the first image data IDT1, and the weights Wmd2 of the second mode may include weights of a deep neural network collected through training based on the second pattern of the first image data IDT1.

The first training data TD1 and the second training data TD2 may be stored in a memory, such as a first memory 141 and a second memory 142, respectively. The first memory 141 and the second memory 142 may be implemented by a volatile memory such as dynamic random access memory (DRAM) or static RAM (SRAM), or non-volatile memory such as phase-change RAM (PRAM), resistive RAM (Re-RAM), or NAND flash. The first memory 141 and the second memory 142 may be provided in the image sensor 100 or the image signal processor 130 or in a separate semiconductor chip apart from the image sensor 100. The first memory 141 and the second memory 142 may include separate semiconductor memory devices or may be different storing regions in one semiconductor memory device.

The mode determiner 132 may access the first memory 141 or the second memory 142 based on the determined operation mode, read out training data corresponding to the operation mode, and provide the read training data to the processing logic 131.

In an embodiment, the mode determiner 132 may determine the operation mode based on a setting signal, such as a user setting signal received outside the image sensor 100. In an embodiment, the mode determiner 132 may determine the operation mode based on sensing setting information of the image sensor 100, such as an analog gain of a sensing circuit provided in the readout circuit 120 or exposure time of the pixel array 110.

Thus, according to an embodiment of the present disclosure, an electronic device including and image sensor 100 may receive light at the image sensor 100 based on setting information, generate an image output based on the received light (e.g., using the readout circuit 120), estimate a noise level based on the setting information, selecting training data from among a plurality of training data sets based on the estimated noise level, and perform a deep learning process on the image output based on the selected training data (e.g., using processing logic 131).

In some embodiments, the device identifies one or more bad pixels of the image sensor, and adjusts the selected training set based on identifying the one or more bad pixels. In some embodiments, each of the plurality of training sets is stored in a separate memory component (e.g., first memory 141 and second memory 142).

In some examples, training a deep neural network may be performed in real time based on the image output and the training data. In other examples, the training data represents trained parameters which have been determined previously on a different device, and the parameters are used by the processing logic to form a neural network.

Figure 7:
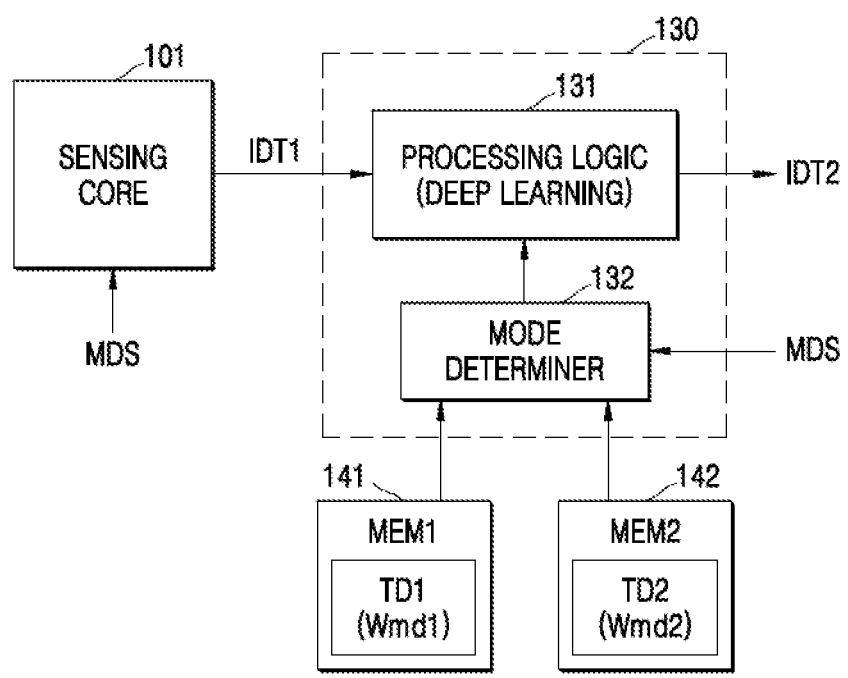
FIG. 7 is a block diagram of a method of operating an image signal processor, according to an embodiment of the inventive concept.

FIG. 7 is a block diagram of a method of operating an image signal processor, according to an embodiment of the inventive concept.

Referring to FIG. 7, the mode determiner 132 may receive a mode determination signal MDS and determine the operation mode based on the mode determination signal MDS. In an embodiment, the mode determination signal MDS may include a user setting signal. In an embodiment, the mode determination signal MDS may include a signal generated by an internal operation in an electronic apparatus in which an image sensor is mounted.

In an embodiment, the mode determination signal MDS may be provided to the sensing core 101, such as the readout circuit 120 of FIG. 1. The readout circuit 120 may adjust a sensing setting. A sensing setting may be an exposure time, an analog gain, an inclination of a ramp signal, or a frame rate of image data based on the mode determination signal MDS, but is not limited thereto.

For example, when the mode determination signal MDS is at a first level such as logic high, the readout circuit 120 may operate in the first mode and output the first image data IDT1 of the first pattern. The mode determiner 132 may determine the first mode based on the mode determination signal MDS of the first level and provide the first training data TD1 to the processing logic 131. The processing logic 131 may perform image processing on the first image data IDT1 of the first pattern based on the first training data TD1.

When the mode determination signal MDS is in a second level, such as logic low, the readout circuit 120 may operate in the second mode. Then, the mode determination signal MDS may output the first image data IDT1 of the second pattern. The mode determiner 132 may determine the second mode based on the mode determination signal MDS of the second level and provide the second training data TD2 to the processing logic 131. The processing logic 131 may perform image processing on the first image data IDT1 of the second pattern based on the second training data TD2.

Figure 8A:
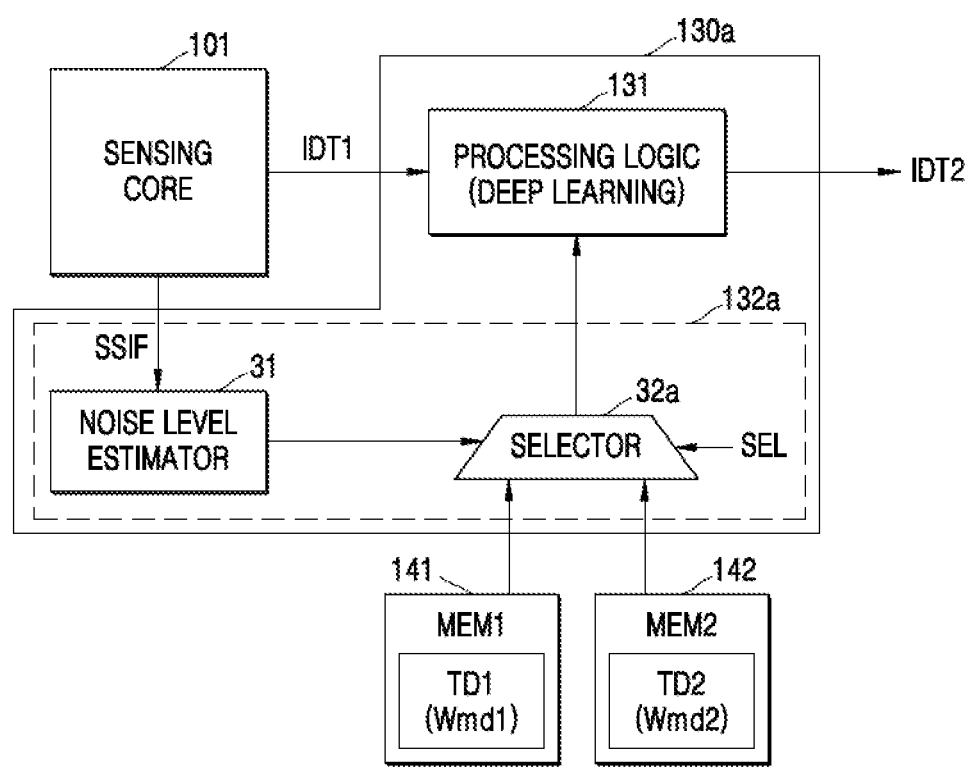
FIGS. 8A and 8B are block diagrams of image signal processors according to embodiments of the inventive concept.
Figure 8B:
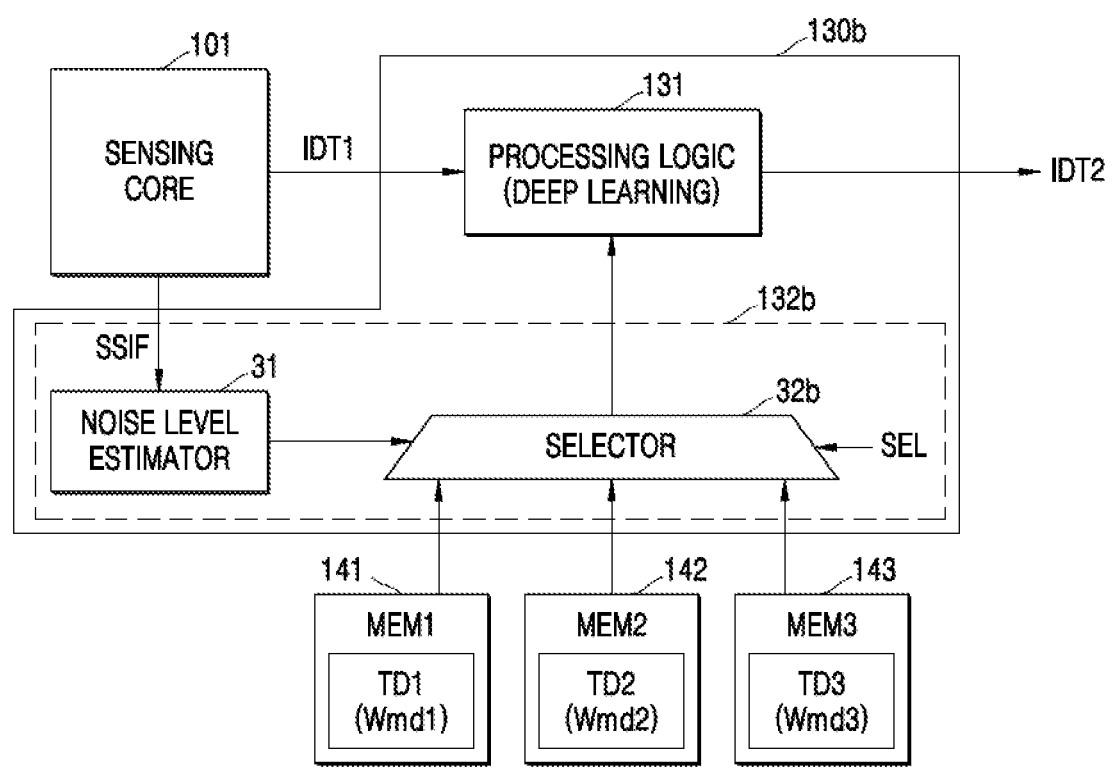

FIGS. 8A and 8B are block diagrams of image signal processors according to embodiments of the inventive concept.

Referring to FIG. 8A, the image signal processor 130a may include the processing logic 131 and a mode determiner 132a. The mode determiner 132a may include a noise level estimator 31 and a selector 32a.

The noise level estimator 31 may estimate a noise level of the first image data IDT1 based on sensing setting information SSIF and determine the operation mode based on the estimated noise level. For example, the sensing setting information SSIF may include the analog gain or the exposure time of the ADC 123 of FIG. 3. The sensing setting information SSIF may be provided by the sensing core 101. Additionally, when the external processor 200 of FIG. 1 controls a sensing setting, the sensing setting information SSIF may be received from an external processor.

For example, when the image sensor 100 of FIG. 1 senses an optical signal of an object in a low illumination environment, the exposure time may be set to be relatively long. The noise level estimator 31 may estimate that the noise level of the first image data IDT1 is higher as the exposure time is set to be longer.

For example, when the pixel array 110 (see FIG. 1) of the sensing core 101 has a Quad-Bayer pattern structure and the exposure time is set to relatively long, the readout circuit 120 of FIG. 1 may output the first image data IDT1 of a Bayer pattern according to the second operation mode MD2 of FIG. 5. When the exposure time is set to be relatively short, the readout circuit 120 may output the first image data IDT1 of a Quad-Bayer pattern according to the first operation mode MD1 of FIG. 6.

The noise level estimator 31 may determine the operation mode based on the estimated noise level. For example, when the estimated noise level is equal to or less than a first reference value, the noise level estimator 31 may determine the operation mode to be the first mode. Additionally, when the estimated noise level exceeds the first reference value, the noise level estimator 31 may determine the operation mode to be the second mode.

The selector 32a may select one of the first training data TD1 and the second training data TD2 based on the operation mode determined by the noise level estimator 31 and provide the selected training data to the processing logic 131.

Referring to FIG. 8B, an image signal processor 130b may include the processing logic 131 and a mode determiner 132b. Additionally, the mode determiner 132b may include the noise level estimator 31 and a selector 32b. The structure and operation of the image signal processor 130b of FIG. 8B are similar to those of the image signal processor 130a of FIG. 8A. Accordingly, differences therebetween are mainly described below.

In FIG. 8B, the first to third training data TD1 to TD3 may be provided to the processing logic 131. For example, the first training data TD1 may include the weights Wmd1 trained based on the first image data IDT1 of the first pattern. The second training data TD2 may include the weights Wmd2 trained based on the first image data IDT1 of the second pattern. The third training data TD3 may include weights Wmd3 trained based on the first image data IDT1 of a third pattern.

The noise level estimator 31 may estimate the noise level of the first image data IDT1 based on the sensing setting information SSIF and determine the operation mode based on the estimated noise level. The noise level estimator 31 may determine one of the first to third operation modes based on the estimated noise level.

The first training data TD1, second training data TD2, and third training data TD3 may be stored in first to third memories 141, 142, and 143, respectively. Additionally, the selector 32b may select one of the first to third training data TD1 to TD3 based on the operation mode determined by the noise level estimator 31 and provide the selected training data to the processing logic 131.

Figure 9:
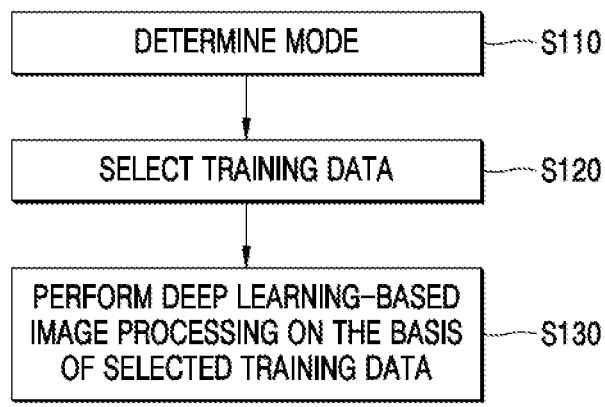
FIG. 9 is a flowchart of a method of operating an image signal processor, according to an embodiment of the inventive concept.

FIG. 9 is a flowchart of a method of operating an image signal processor, according to an embodiment of the inventive concept. The operation method of FIG. 9 may be performed in the image signal processors 130, 130a, and 130b described above with reference to FIGS. 6 to 8B. Accordingly, the descriptions presented with reference to FIGS. 6 to 8B may be applied to the embodiment of FIG. 9.

Referring to FIG. 9, the image signal processor 130 may determine the operation mode of an image sensor (S110). For example, the mode determiner 132 of FIG. 6 may determine an operation mode based on the setting signal received outside the image sensor 100 or the sensing setting information of the image sensor 100.

The image signal processor 130 may select training data based on the operation mode (S120). For example, the mode determiner 132 may select one of the first and second training data TD1 and TD2 or one of the first to third training data TD1, TD2, and TD3 based on the determined operation mode.

The image signal processor 130, in detail, the processing logic 131 of FIG. 6, may perform deep learning-based image processing on the first image data based on the selected training data (S130).

Figure 10A:
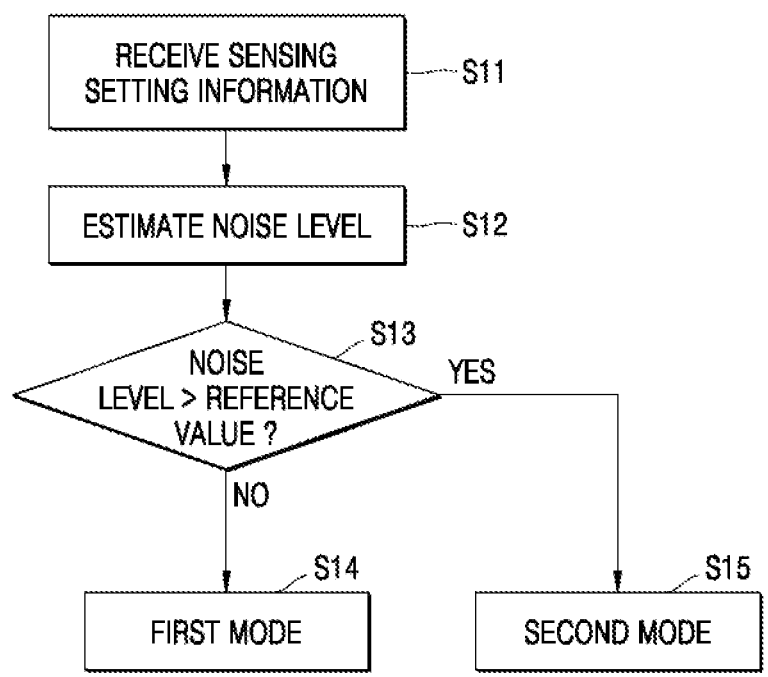
FIGS. 10A and 10B are flowcharts of the mode determination method of FIG. 9 according to embodiments of the inventive concept.
Figure 10B:
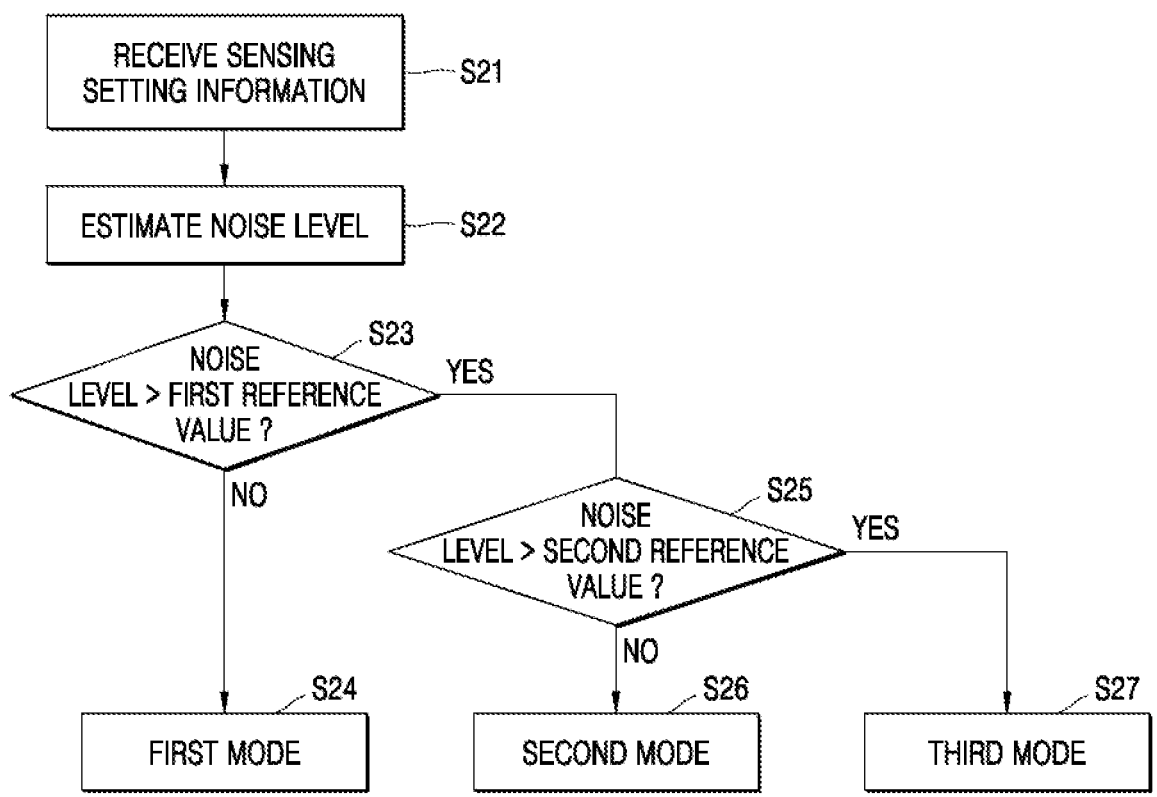

FIGS. 10A and 10B are flowcharts of the mode determination method of FIG. 9 according to embodiments of the inventive concept. The operation method of FIG. 10A may be performed by the image signal processor 130*a* of FIG. 8A, and the operation method of FIG. 10B may be performed by the image signal processor 130*b* of FIG. 8B.

Referring to FIG. 10A, the noise level estimator 31 may receive sensing setting information (S11). The noise level estimator 31 may estimate a noise level of the first image data based on the sensing setting information (S12). The noise level estimator 31 may compare the estimated noise level with a reference value (S13). The noise level estimator 31 may determine the operation mode to be the first mode when the estimated noise level is equal to or less than the reference value (S14). The noise level estimator 31 may determine the operation mode to be the second mode when the estimated noise level exceeds the reference value (S15).

Referring to FIG. 10B, the noise level estimator 31 may receive the sensing setting information (S21). The noise level estimator 31 may estimate a noise level of the first image data based on the sensing setting information (S22). The noise level estimator 31 may compare the estimated noise level with the reference value (S23). The noise level estimator 31 may determine the operation mode to be the first mode when the estimated noise level is equal to or less than the first reference value (S24).

The noise level estimator 31 may compare the estimated noise level with a second reference value when the estimated noise level exceeds the first reference value (S25). The noise level estimator 31 may determine the operation mode to be the second mode when the estimated noise level is equal to or less than the second reference value (S26). The noise level estimator 31 may also determine the operation mode to be the third mode when the estimated noise level exceeds the second reference value (S27).

Figure 11:
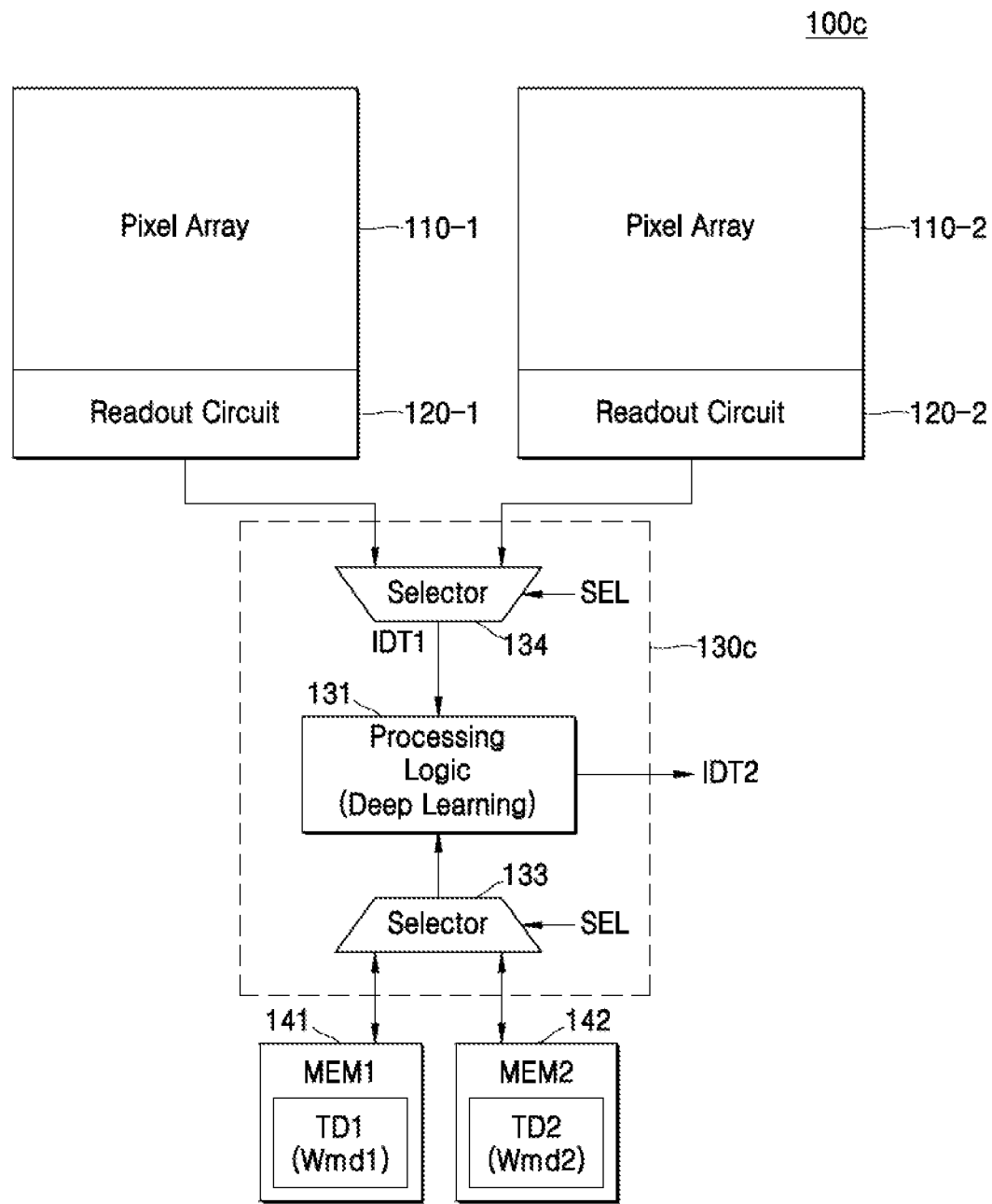
FIG. 11 is a block diagram of an image sensor according to an embodiment of the inventive concept.

FIG. 11 is a block diagram of an image sensor 100*c* according to an embodiment of the inventive concept.

Referring to FIG. 11, the image sensor 100*c* may include a first pixel array 110-1, a first readout circuit 120-1, a second pixel array 110-2, a second readout circuit 120-2, and an image signal processor 130*c*. In an embodiment, the image sensor 100*c* may include the first memory 141 and the second memory 142.

The first pixel array 110-1 and the second pixel array 110-2 may have homogeneous or heterogeneous pattern structures. For example, the first pixel array 110-1 may have a Bayer pattern structure, and the second pixel array 110-2 may have a Quad-Bayer pattern structure.

The first readout circuit 120-1 may generate sensing signals output from the first pixel array 110-1 based on image data. The second readout circuit 120-2 may generate sensing signals output from the second pixel array 110-2 based on image data.

The image signal processor 130*c* may include the processing logic 131, a first selector 134, and a second selector 133.

The first selector 134 may receive image data from one of the first readout circuit 120-1 and the second readout circuit 120-2, in response to a selection signal SEL, and provide the image data to the processing logic 131 as the first image data IDT1.

The second selector 133 may select one of the first training data TD1 and the second training data TD2, in response to the selection signal SEL, and provide the selected training data to the processing logic 131. In this state, the first training data TD1 may include the weights Wmd1 determined through training based on a pattern structure of the first pixel array 110-1. The second training data TD2 may include the weights Wmd2 determined through training based on a pattern structure of the second pixel array 110-2.

For example, the first selector 134 may provide the image data received from the first readout circuit 120-1 to the processing logic 131 as the first image data IDT1 in response to the selection signal SEL of a first level, for example, logic high. The second selector 133 may provide the first training data TD1 to the processing logic 131 in response to the selection signal SEL of a first level.

The processing logic 131 may perform deep learning-based image processing on the first image data IDT1. The deep learning-based image processing may be generated based on the sensing signals of the first pixel array 110-1 by using the weights Wmd2. The weights Wmd2 may be determined through training based on the pattern structure of the first pixel array 110-1.

Figure 12:
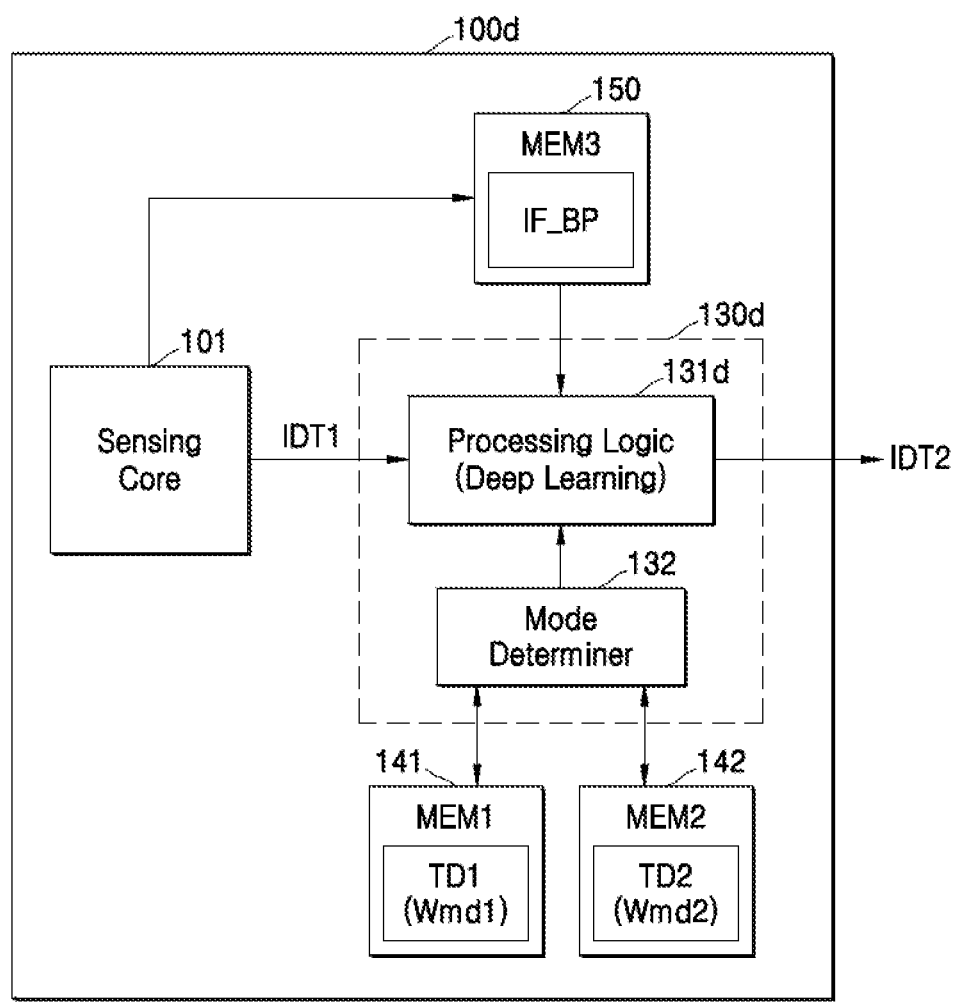
FIG. 12 is a block diagram of an image sensor according to an embodiment of the inventive concept.

FIG. 12 is a block diagram of an image sensor 100*d* according to an embodiment of the inventive concept.

Referring to FIG. 12, the image sensor 100*d* may include the sensing core 101, an image signal processor 130*d*, the first memory 141, the second memory 142, and a third memory 150. The sensing core 101 may include a pixel array and a readout circuit. In an embodiment, the first memory 141, the second memory 142, and the third memory 150 may be implemented by a separate semiconductor integrated circuit outside the image sensor 100*d*.

The image signal processor 130*d* may include a processing logic 131*d* and the mode determiner 132. The mode determiner 132 may determine the operation mode of the image sensor 100*d* and select one of the first training data TD1 and the second training data TD2 respectively stored in the first memory 141 and the second memory 142 based on the operation mode and provide the selected one to the processing logic 131*d*.

The processing logic 131*d* may perform deep learning-based image processing on the first image data IDT1 based on the received training data. The processing logic 131*d* may adjust the bad pixel information IF_BP based on training data. For example, the processing logic 131*d* may set a weight related to a bad pixel among the weights included in the training data to a zero value. The processing logic 131*d* may perform deep learning-based image processing based on the adjusted training data.

The bad pixel information IF_BP may include positions of bad pixels on a pixel array. The bad pixel information IF_BP may be detected in a manufacturing process (wafer level) of the image sensor 100*d*. Additionally, the bad pixel information IF_BP may be stored in the third memory 150. The bad pixel information IF_BP may also be regularly or irregularly detected during the operation of the image sensor 100*d* to be stored in the third memory 150 or updated.

The third memory 150 may be implemented by a non-volatile memory, for example, one-time programmable memory (OTP), NAND flash, ReRAM, or PRAM. The third memory 150 may be provided in the image sensor 100d or implemented by a separate semiconductor integrated circuit apart from the image sensor 100d.

In an embodiment, the processing logic 131d may store the adjusted training data in a memory, for example, the first memory 141 or the second memory 142, so as to update the training data. For example, when the first training data TD1 is provided to the processing logic 131d, the processing logic 131d may set a weight related to a bad pixel among the weights included in the first training data TD1 to a zero value based on the bad pixel information IF_BP. Accordingly, the first training data TD1 may be adjusted. The processing logic 131d may update the first training data TD1 by storing the adjusted first training data in the first memory 141. Then, until the bad pixel information IF_BP is updated, the updated first training data TD1 may be used based on the bad pixel information IF_BP.

Figure 13:
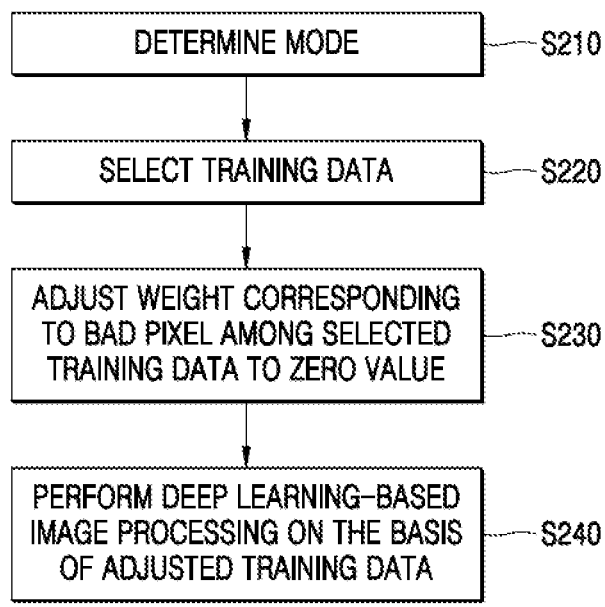
FIG. 13 is a flowchart of a method of operating an image signal processor, according to an embodiment of the inventive concept.

FIG. 13 is a flowchart of a method of operating an image signal processor, according to an embodiment of the inventive concept. FIG. 13 illustrates an operation method of the image signal processor 130d of FIG. 12. Accordingly, the descriptions presented with reference to FIG. 12 may be applied to the present embodiment.

Referring to FIG. 13, the mode determiner 132 may determine the operation mode of the image sensor 100d (S210). The mode determiner 132 may select training data based on the determined operation mode (S220). For example, the mode determiner 132 may select one of the first training data TD1 and the second training data TD2 based on the operation mode. The mode determiner 132 may provide the selected training data to the processing logic 131d.

The processing logic 131d (or another logic circuit that may be added) may set a weight corresponding to a bad pixel among the weights included in the selected training data (S230). Accordingly, the training data may be adjusted.

The processing logic 131d may perform deep learning-based image processing on the first image data IDT1 based on the adjusted training data (S240).

The image data with a bad pixel may cause an error during the deep learning-based image processing. To prevent the error, during training for determining the weights (e.g., training data), if information about bad pixels is considered, determining a set of training data may be difficult, due to various cases.

In the present embodiment as described above with reference to FIGS. 12 and 13, the generation of errors due to bad pixels may be prevented by setting the weight related to a bad pixel to a zero value when the weights are applied to the processing logic 131d rather than using the bad pixel information IF_BP when the weights are determined (e.g., during training). The bad pixel information IF_BP may be used in the weight application operation, not in the training operation, so that the set of training data may be simplified.

Figure 14:
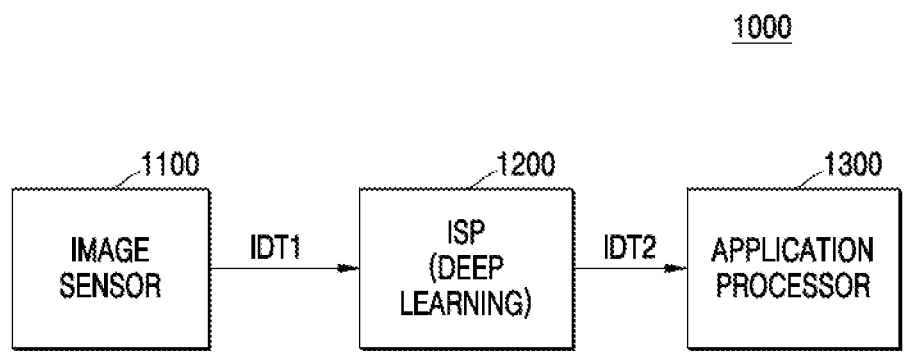
FIG. 14 is a block diagram of an image processing apparatus according to an embodiment of the inventive concept.

FIG. 14 is a block diagram of an image processing apparatus 1000 according to an embodiment of the inventive concept.

Referring to FIG. 14, the image processing apparatus 1000 (or photographing apparatus) may include an image sensor 1100, an image signal processor 1200, and an application processor 1300. The image sensor 1100 may include a pixel array and a readout circuit and output raw image data (original image data) as the first image data IDT1.

The image signal processors described above with reference to FIGS. 1 to 13 may be applied to the image signal processor 1200. The image signal processor 1200 may perform deep learning-based image processing on the first image data IDT1. The image signal processor 1200 may store predetermined weight sets corresponding to various output patterns of the first image data IDT1. Additionally, the image signal processor 1200 may perform deep learning-based image processing by using one of the weight sets based on the output patterns of the first image data IDT1. Furthermore, the image signal processor 1200 may set a weight corresponding to a bad pixel among the weights to a zero value based on the bad pixel information, thereby removing an error due to the bad pixel. The image signal processor 1200 may provide the image-processed image data. For example, the second image data IDT2 may be provided to the application processor 1300.

The application processor 1300 may perform an additional operation based on the received second image data IDT2. In an embodiment, the application processor 1300 may include an image processing circuit for performing image processing of a higher level than the image signal processor 1200. Additionally, the image processing circuit may perform image processing on the second image data IDT2. For example, the image processing circuit may change a data format of the second image data IDT2 or adjust the size of the second image data IDT2.

Figure 15:
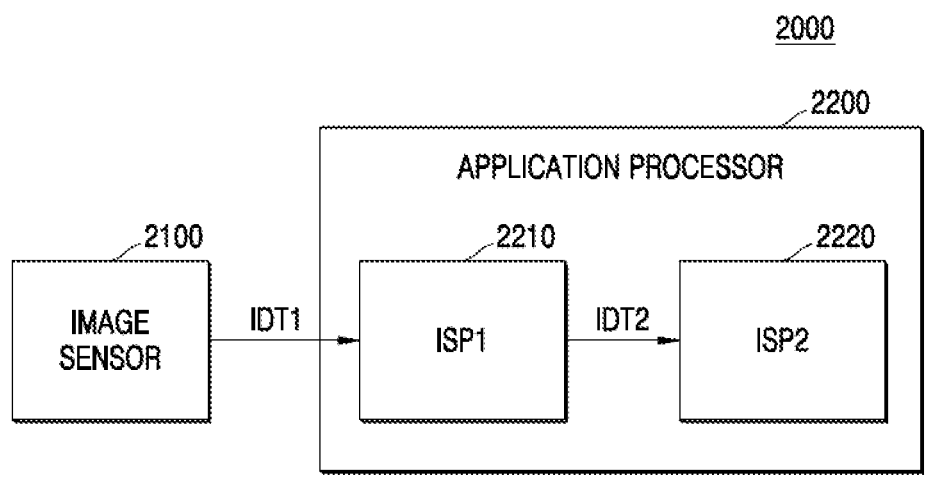
FIG. 15 is a block diagram of an image processing apparatus according to an embodiment of the inventive concept.

FIG. 15 is a block diagram of an image processing apparatus 2000 according to an embodiment of the inventive concept.

Referring to FIG. 15, the image processing apparatus 2000 may include an image sensor 2100 and an application processor 2200.

The application processor 2200 may include a first image signal processor 2210 and a second image signal processor 2220. The second image signal processor 2220 may perform image processing of a higher level than the first image signal processor 2210. For example, the first image signal processor 2210 may perform image processing such as bad pixel correction or noise removal. The second image signal processor 2220 may perform image processing such as color coordinate change, brightness adjustment, sharpness adjustment, or contrast adjustment of image data.

The image signal processors described above with reference to FIGS. 1 to 13 may be applied to the first image signal processor 2210. The first image signal processor 2210 may receive the first image data IDT1 from the image sensor 2100 and may perform deep learning-based image processing on the first image data IDT1. In this state, the first image data IDT1 may include raw image data. The first image signal processor 2210 may store predetermined weight sets corresponding to various output patterns of the first image data IDT1. The first image signal processor 2210 may also perform deep learning-based image processing by using one of the weight sets based on the output pattern of the first image data IDT1. Furthermore, the first image signal processor 2210 may set a weight corresponding to a bad pixel among the weights to a zero value based on the bad pixel information, thereby removing an error due to the bad pixel.

Figure 16:
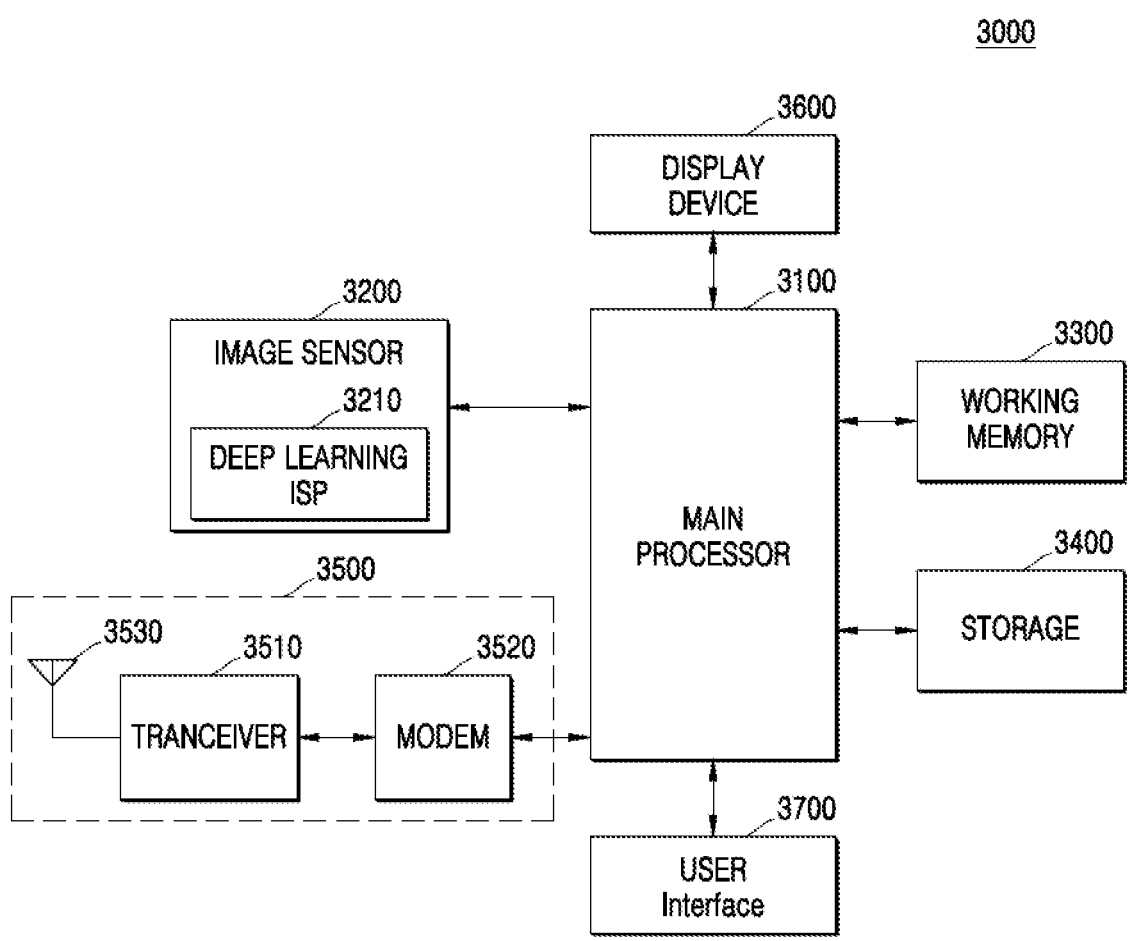
FIG. 16 is a block diagram of an electronic apparatus including an image sensor according to an embodiment of the inventive concept.

FIG. 16 is a block diagram of an electronic apparatus 3000 including an image sensor 3200, according to an embodiment of the inventive concept. The electronic apparatus 3000 of FIG. 16 may include a portable terminal.

Referring to FIG. 16, the electronic apparatus 3000 may include a main processor 3100, the image sensor 3200, a display apparatus 3600, a working memory 3300, a storage 3400, a user interface 3700, and a wireless transceiver 3500.

The main processor 3100 may control the overall operation of the electronic apparatus 3000 and may be implemented by a system-on-chip (SoC) for driving an application program or an operating system. The main processor 3100 may provide image data provided by the image sensor 3200 to the display apparatus 3600 or store the image data in the storage 3400. In an embodiment, the main processor 3100 may include an image processing circuit and perform image processing such as image quality adjustment or data format change on the image data received from the image sensor 3200.

The image sensors 100, 100c, and 100d described with reference to FIGS. 1, 11, and 12 may be adopted as the image sensor 3200. The image sensor 3200 may store various training data. For example, the image sensor 3200 may store, select a weight set corresponding to the pattern of the image data, and perform deep learning-based image processing on the basis thereof. Weight sets may correspond to various patterns of the generated image data. Furthermore, the image sensor 3200 may store information about bad pixels and set a weight corresponding to a bad pixel among the weights of a weight set to a zero value, thereby preventing generation of an error due to the bad pixel. The image sensor 3200 may include a deep learning image signal processor 3210, and the above image signal processors described by referring to FIG. 1 to FIG. 13 may be applied to the deep learning image signal processor 3210.

The working memory 3300 may be implemented by a volatile memory such as DRAM or SRAM, or a non-volatile resistive memory such as FeRAM, RRAM, or PRAM. The working memory 3300 may store programs and/or data that are processed or executed by the main processor 3100.

The storage 3400 may be implemented by a non-volatile memory device such as NAND flash or resistive memory. For example, the storage 3400 may be provided as a memory card such as MMC, eMMC, SD, or micro SD. The storage 3400 may store the image data provided by the image sensor 3200.

The user interface 3700 may be implemented by various devices capable of receiving a user input, such as a keyboard, a certain key panel, a touch panel, a fingerprint sensor, or a microphone. The user interface 3700 may receive a user input and provide a signal corresponding to the received user input to the main processor 3100.

The wireless transceiver 3500 may include a transceiver 3510, a modem 3520, and an antenna 3530.

As presented above, embodiments are disclosed in the drawings and the specification. While the present disclosure has been particularly shown and described with reference to preferred embodiments using specific terminologies, the embodiments and terminologies should be considered in a descriptive sense only and not for purposes of limitation. Therefore, it will be understood by those of ordinary skill in the art that various changes in form and details may be made therein without departing from the spirit and scope of the present disclosure as defined by the following claims.

What is claimed is:

1. An image sensor comprising:
a pixel array configured to convert received optical signals into electrical signals;
a readout circuit configured to identify an operation mode of the image sensor, to identify a data pattern from a set of data patterns including a first data pattern and a second data pattern based on the operation mode, to convert the electrical signals into image data based on the data pattern, and to output the image data; and
an image signal processor configured to select training data from among first training data and second training data based on the data pattern and a noise level of the image data, and to perform deep learning-based image processing on the image data based on the selected training data, wherein the image signal processor comprises a noise level estimator configured to estimate the noise level of the image data, and wherein the first training data comprises first weights trained based on the first data pattern and the second training data comprises second weights trained based on the second data pattern.

2. The image sensor of claim 1, further comprising:
a first memory storing the first training data; and
a second memory storing the second training data.

3. The image sensor of claim 1, wherein the image signal processor further comprises:
a processing logic implemented based on a deep neural network model; and
a selector configured to select one of the first training data and the second training data based on the operation mode and provide selected training data to the processing logic, wherein the operation mode is determined by the noise level estimator based on the estimated noise level.

4. The image sensor of claim 3, wherein the noise level estimator determines the operation mode by comparing the noise level with a reference value.

5. The image sensor of claim 1, wherein image data is output by the readout sensor based on sensing setting information, the sensing setting information comprising at least one of an analog gain and an exposure time of the readout circuit.

6. The image sensor of claim 1, wherein the image sensor stores information about bad pixels of a plurality of pixels of the pixel array.

7. The image sensor of claim 6, wherein the image signal processor adjusts selected training data by setting weights corresponding to the bad pixels of the weights of the selected training data to a zero value and performs the deep learning-based image processing based on the adjusted training data.

8. The image sensor of claim 7, wherein the image signal processor updates the selected training data based on the adjusted training data.

9. The image sensor of claim 1, wherein
the pixel array comprises a Quad-Bayer pattern structure, and the image data is output as the first data pattern corresponding to the Quad-Bayer patternstructure or as the second data pattern corresponding to a Bayer pattern structure.

10. The image sensor of claim 9, wherein the first training data corresponds to the first data pattern, and the second training data corresponds to the second data pattern.

11. A method of image processing, the method comprising:
receiving light at an image sensor based on setting information;
identifying an operation mode of the image sensor;
identifying a data pattern based on the operation mode;
generating an image output based on the received light and the data pattern;
estimating a noise level of the image output based on the setting information;
selecting training data from among a plurality of training data sets based on the data pattern and the estimated noise level, wherein the selected training data set comprises weights trained based on the identified data pattern; and performing a deep learning process on the image output based on the selected training data to produce a modified image output.

12. The method of claim 11, further comprising:

identifying one or more bad pixels of the image sensor; and adjusting the selected training data based on identifying the one or more bad pixels.

13. The method of claim 11, wherein each of the plurality of training data sets is stored in a separate memory component.

* * * * *